(12) United States Patent
Spielmann et al.

(10) Patent No.: US 12,289,373 B2
(45) Date of Patent: Apr. 29, 2025

(54) METHOD FOR TRANSMITTING ONE OR MORE DATA ELEMENTS FROM A VEHICLE TO A SERVER, COMPUTER-READABLE MEDIUM, SYSTEM AND VEHICLE

(71) Applicant: Bayerische Motoren Werke Aktiengesellschaft, Munich (DE)

(72) Inventors: Michael Spielmann, Olching (DE); Carsten Woche, Dachau (DE); Andrew Mellett, Eching (DE); Cornelius Krebs, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 176 days.

(21) Appl. No.: 17/615,583

(22) PCT Filed: May 29, 2020

(86) PCT No.: PCT/EP2020/065030
§ 371 (c)(1),
(2) Date: Nov. 30, 2021

(87) PCT Pub. No.: WO2021/001096
PCT Pub. Date: Jan. 7, 2021

(65) Prior Publication Data
US 2023/0023305 A1   Jan. 26, 2023

(30) Foreign Application Priority Data
Jul. 3, 2019   (DE) ..................... 10 2019 117 946.7

(51) Int. Cl.
*H04L 67/12* (2022.01)
*H04L 67/61* (2022.01)

(52) U.S. Cl.
CPC .............. *H04L 67/12* (2013.01); *H04L 67/61* (2022.05)

(58) Field of Classification Search
CPC ......... H04L 67/12; H04L 67/61; H04L 67/06; H04L 67/303; H04L 41/06;
(Continued)

(56) References Cited

U.S. PATENT DOCUMENTS 5,948,025 A * 9/1999 Sonoda ............... B60R 16/0315
340/3.3
10,282,711 B2 * 5/2019 Chan ..................... G06Q 10/103
(Continued)

FOREIGN PATENT DOCUMENTS

CN   103891248 A   6/2014
CN   104590210 A   5/2015
(Continued)

OTHER PUBLICATIONS

International Search Report corresponding to International Patent Application No. PCT/EP2020/065030, dated Jul. 22, 2020 (4 pages).
(Continued)

*Primary Examiner* — Michael Won
(74) *Attorney, Agent, or Firm* — Maginot, Moore & Beck LLP

(57) ABSTRACT

A method for transmitting one or more data elements from a vehicle to a server via a communication channel between the vehicle and the server includes the vehicle determining a first event, and transmitting the first event from the vehicle to the server via the communication channel. The server receives the first event and determines a relevance parameter of the first event. Responsive to the relevance parameter indicating that the first event is relevant to the server, a message is transmitted requesting a first data element associated with the first event from the server to the vehicle via the communication channel. The vehicle receives the message for requesting the first data element and determines the first data element associated with the first event. The first (Continued)

data element is transmitted from the vehicle to the server via the communication channel on the basis of a communication-channel-specific parameter of the communication channel.

17 Claims, 2 Drawing Sheets

(58) Field of Classification Search
CPC ........... H04L 41/0654; H04L 12/40169; H04L 29/06891; H04W 52/0225; H04W 52/0251
See application file for complete search history.

(56) References Cited

U.S. PATENT DOCUMENTS

| | | | |
|---|---|---|---|
| 10,325,423 B1 | 6/2019 | Mannan et al. | |
| 10,332,396 B1* | 6/2019 | Christensen | .......... B60W 30/10 |
| 11,587,365 B2* | 2/2023 | Zucconelli | ............ H04W 4/029 |
| 11,658,966 B2* | 5/2023 | Yu | .......................... G06F 16/436 |
| | | | 726/4 |
| 2001/0056518 A1* | 12/2001 | Maeda | ................. G06F 13/4239 |
| | | | 711/103 |
| 2007/0079370 A1* | 4/2007 | Jinkawa | ................... G06F 21/34 |
| | | | 726/19 |
| 2013/0274950 A1 | 10/2013 | Richardson et al. | |
| 2013/0325940 A1 | 12/2013 | Foti | |
| 2015/0088335 A1* | 3/2015 | Lambert | ................... G06N 7/01 |
| | | | 701/1 |
| 2015/0278118 A1* | 10/2015 | Lee | ........................ G06F 12/145 |
| | | | 711/102 |
| 2017/0169625 A1* | 6/2017 | Lavie | ................... G08G 1/0141 |
| 2017/0345227 A1 | 11/2017 | Allen, Jr. et al. | |
| 2019/0109886 A1 | 4/2019 | Urs Mysore Krishna et al. | |
| 2021/0374414 A1* | 12/2021 | Wilkosz | ................. G06V 20/35 |

FOREIGN PATENT DOCUMENTS

| | | |
|---|---|---|
| DE | 19650236 A1 | 6/1998 |
| DE | 102013203501 A1 | 9/2014 |
| DE | 102016003969 A1 | 10/2017 |
| DE | 102018008730 A1 | 5/2020 |

OTHER PUBLICATIONS

German Search Report corresponding to German Patent Application No. 10 2019 117 946.7, dated Jun. 22, 2020 (7 pages).

Chinese Office Action corresponding to Chinese Patent Application No. 2024011100040900, dated Jan. 11, 2024 (6 pages).

English Translation of Chinese Office Action corresponding to Chinese Patent Application No. 2024011100040900, dated Jan. 11, 2024 (7 pages).

* cited by examiner

METHOD FOR TRANSMITTING ONE OR MORE DATA ELEMENTS FROM A VEHICLE TO A SERVER, COMPUTER-READABLE MEDIUM, SYSTEM AND VEHICLE The present application is the U.S. national phase of PCT Application PCT/EP2020/065030 filed on May 29, 2020, which claims priority of German patent application No. 102019117946.7 filed on Jul. 3, 2019, which is incorporated herein by reference in its entirety.

TECHNICAL FIELD

The disclosure relates to a method for transmitting one or more data elements from a vehicle to a server via a communication channel between the vehicle and the server, a computer-readable medium for transmitting one or more data elements from a vehicle to a server to a system for transmitting one or more data elements from a vehicle to a server, and to a vehicle comprising the system for transmitting one or more data elements from a vehicle to a server.

BACKGROUND

The prior art discloses methods for transmitting data from a vehicle to a server. For this purpose, a server, for example, can transmit a request to the vehicle and the vehicle can transmit data to the server in response to this request. However, these methods can only usually transmit relatively small volumes of data, for example a few kilobytes or megabytes, from a vehicle to a server. Large volumes of data, for example a hundred or more megabytes for each vehicle, often cannot be transmitted from a vehicle to a server.

Therefore, an object is to efficiently transmit data from a vehicle to a server. In particular, an object is to efficiently transmit data from one or more control units of a vehicle to a server.

SUMMARY

This object is achieved by means of the features of the independent claims. Advantageous configurations and developments emerge from the dependent claims.

According to a first aspect, a method transmits one or more data elements from a vehicle to a server via a communication channel between the vehicle and the server. The method may be a computer-implemented and/or control-unit-implemented method. A data element may comprise data, for example diagnostic data and/or log data, from a data memory of a control unit associated with an event of the control unit. The data element may comprise one or more files which are stored on a storage medium. For example, the data element may comprise one or more log files. The communication channel is preferably a wireless communication channel between the vehicle and the server. The method comprises the vehicle determining a first event. The first event may be, for example, an event of a driver assistance system, of a sensor, a time-based event and/or a communication event. The first event may also be a fault event. The first event may be linked to one or more data elements.

The method comprises transmitting the first event from the vehicle to the server via the communication channel, the server receiving the first event from the vehicle via the communication channel, and the server determining a relevance parameter of the first event. The relevance parameter is preferably context-dependent. For example, the relevance parameter may be determined by the server on the basis of a vehicle-specific and/or an event-specific context. If the relevance parameter indicates that the first event is relevant to the server, the method comprises transmitting a message for requesting a first data element associated with the first event from the server to the vehicle via the communication channel, the vehicle receiving the message for requesting the first data element associated with the first event from the server via the communication channel, the vehicle determining the first data element associated with the first event, transmitting the first data element from the vehicle to the server via the communication channel on the basis of a communication-channel-specific parameter of the communication channel, and the server receiving the first data element from the vehicle via the communication channel. The volume of data relating to an event, in particular the first event, is preferably small in comparison with the volume of data in a data element, in particular the first data element. For example, the volume of data relating to an event is a few bytes, for example 1, 2, 3, 4, . . . bytes, to a few kilobytes, for example 1, 2, 3, 4, . . . kilobytes. For example, the volume of data in a data element is several megabytes, for example 1, 2, 3, . . . megabytes, to several hundred megabytes, for example 100, 200, 300, . . . megabytes.

The method can advantageously efficiently transmit data elements from the vehicle to the server. The data element linked to an event is transmitted from the vehicle to the server only if the server classifies the event as relevant. Data elements can therefore be efficiently transmitted from a multiplicity of vehicles to the server without the communication channel between the server and the vehicle(s) being overloaded.

According to one advantageous configuration, the determination of the first event by the vehicle may comprise a first control unit of a vehicle determining the first event, determining a first data element associated with the first event in a data memory of the first control unit of the vehicle, and blocking the first data element in the data memory of the first control unit of the vehicle. The blocking of the first data element may comprise, for example, adding write protection, for example temporary write protection, priority-controlled write protection and/or event-controlled write protection, to the first data element, wherein the write protection prevents the first data element from being changed in the data memory of the first control unit. For example, the write protection can prevent the first data element from being changed in the data memory of the first control unit on the basis of a priority of the first event and/or until a release command has been executed. The first control unit can hereby efficiently prevent the first data element associated with the first event from being changed.

According to a further advantageous configuration, the transmission of the first event from the vehicle to the server via the communication channel may comprise transmitting the first event from the first control unit of the vehicle to a second control unit of the vehicle, the second control unit of the vehicle receiving the first event from the first control unit of the vehicle, and transmitting the first event from the second control unit of the vehicle to the server via the communication channel. Furthermore, the reception of the first event by the server from the vehicle via the communication channel may comprise the server receiving the first event from the second control unit of the vehicle via the communication channel. Communication with the server can hereby be efficiently separated from the determination of the first event. The complexity of the first control unit can be efficiently reduced. The first control unit does not require any information relating to the server and the communication channel between the second control unit and the server. Communication with the server can take place solely via the second control unit.

According to a further advantageous configuration, the transmission of a message for requesting a first data element associated with the first event to the vehicle may comprise transmitting the message for requesting the first data element associated with the first event from the server to the second control unit of the vehicle via the communication channel. Furthermore, the reception of the message for requesting the first data element associated with the first event by the vehicle from the server via the communication channel may comprise the second control unit of the vehicle receiving the message for requesting the first data element associated with the first event from the server via the communication channel. Communication with the server can hereby be efficiently separated from the request for the first data element.

According to a further advantageous configuration, the determination of the first data element associated with the first event by the vehicle may comprise transmitting the message for requesting the first data element from the second control unit of the vehicle to the first control unit of the vehicle, the first control unit of the vehicle receiving the message for requesting the first data element from the second control unit of the vehicle, determining the first data element in the data memory of the first control unit of the vehicle, transmitting the first data element from the first control unit of the vehicle to the second control unit of the vehicle, and the second control unit of the vehicle receiving the first data element from the first control unit of the vehicle. The determination of the first data element can hereby be efficiently separated from the communication with the server.

According to a further advantageous configuration, the transmission of the first data element from the vehicle to the server via the communication channel on the basis of the communication-channel-specific parameter of the communication channel may comprise the second control unit of the vehicle determining the communication-channel-specific parameter of the communication channel, and transmitting the first data element from the second control unit of the vehicle to the server on the basis of the communication-channel-specific parameter of the communication channel. The communication-channel-specific parameter may be, for example, an available bandwidth, an error rate and/or a parameter of a communication protocol of the communication channel. The transmission of the first data element to the server can hereby be efficiently controlled by the second control unit. For example, the first data element can be transmitted from the second control unit to the server only in the case of a predefined bandwidth, in particular in the case of a predefined minimum bandwidth, of the communication channel.

According to a further advantageous configuration, the reception of the first data element by the server from the vehicle via the communication channel may comprise the server receiving the first data element from the second control unit of the vehicle on the basis of the communication-channel-specific parameter of the vehicle. The server can hereby efficiently receive the first data element from the second control unit.

According to a further advantageous configuration, the method may also comprise, if the first data element has been completely received by the server from the second control unit of the vehicle, transmitting a release command for releasing the first data element from the server to the second control unit of the vehicle via the communication channel, the second control unit of the vehicle receiving the release command for releasing the first data element from the server via the communication channel, transmitting the release command for releasing the first data element from the second control unit of the vehicle to the first control unit of the vehicle, the first control unit of the vehicle receiving the release command for releasing the first data element from the second control unit of the vehicle, and the first control unit executing the release command for the purpose of releasing the first data element in the data memory of the first control unit. The first data element can hereby be efficiently released in the data memory of the first control unit.

According to a further advantageous configuration, the method may also comprise, if the relevance parameter indicates that the first event is not relevant to the server, transmitting a release command for releasing the first data element associated with the first event from the server to the second control unit of the vehicle via the communication channel, the second control unit of the vehicle receiving the release command for releasing the first data element associated with the first event from the server via the communication channel, transmitting the release command for releasing the first data element associated with the first event from the second control unit of the vehicle to the first control unit of the vehicle, the first control unit of the vehicle receiving the release command for releasing the first data element associated with the first event from the second control unit of the vehicle, and the first control unit executing the release command for the purpose of releasing the first data element associated with the first event in the data memory of the first control unit. The first data element can hereby be efficiently released in the data memory of the first control unit if the first event is not relevant to the server.

According to a further advantageous configuration, the relevance parameter may be representative of a relevance of the first event with respect to an event analysis pattern of an event analysis function of the server. The relevance of the first event can hereby be efficiently determined by the server.

According to a further advantageous configuration, the method may also comprise a third control unit of the vehicle determining a second event, determining a second data element associated with the second event in a data memory of the third control unit of the vehicle, blocking the second data element in the data memory of the third control unit of the vehicle, transmitting the second event from the third control unit of the vehicle to the second control unit of the vehicle, the second control unit of the vehicle receiving the second event from the third control unit of the vehicle, and transmitting the second event from the second control unit of the vehicle to the server. The transmission of events can hereby be centrally combined in the second control unit. The third control unit does not require any information relating to the communication channel and the server. The second control unit can efficiently transmit the events, for example the first event and the second event, from different control units to the server.

According to a further advantageous configuration, the first event, the first data element, the second event and/or a second data element may be transmitted from the second control unit of the vehicle to the server during a journey of the vehicle. The events and/or the data elements can hereby be transmitted to the server promptly.

According to a further aspect, a computer-readable medium for transmitting one or more data elements from a vehicle to a server comprises instructions which, when executed on a computer or a control unit, carry out the method described above.

According to a further aspect, a system for transmitting one or more data elements from a vehicle to a server is configured to carry out the method described above.

According to a further aspect, a vehicle for transmitting one or more data elements from the vehicle to a server includes the system described above.

Further features emerge from the claims, the figures and the description of the figures. All features and combinations of features mentioned in the description above and the features and combinations of features mentioned in the description of the figures below and/or shown in the figures alone can be used not only in the respectively stated combination, but also in other combinations or alone.

BRIEF DESCRIPTION OF THE DRAWINGS

A preferred exemplary embodiment is described below on the basis of the accompanying drawings. Further details, preferred configurations and developments emerge therefrom. In detail.

DETAILED DESCRIPTION

Figure 1:
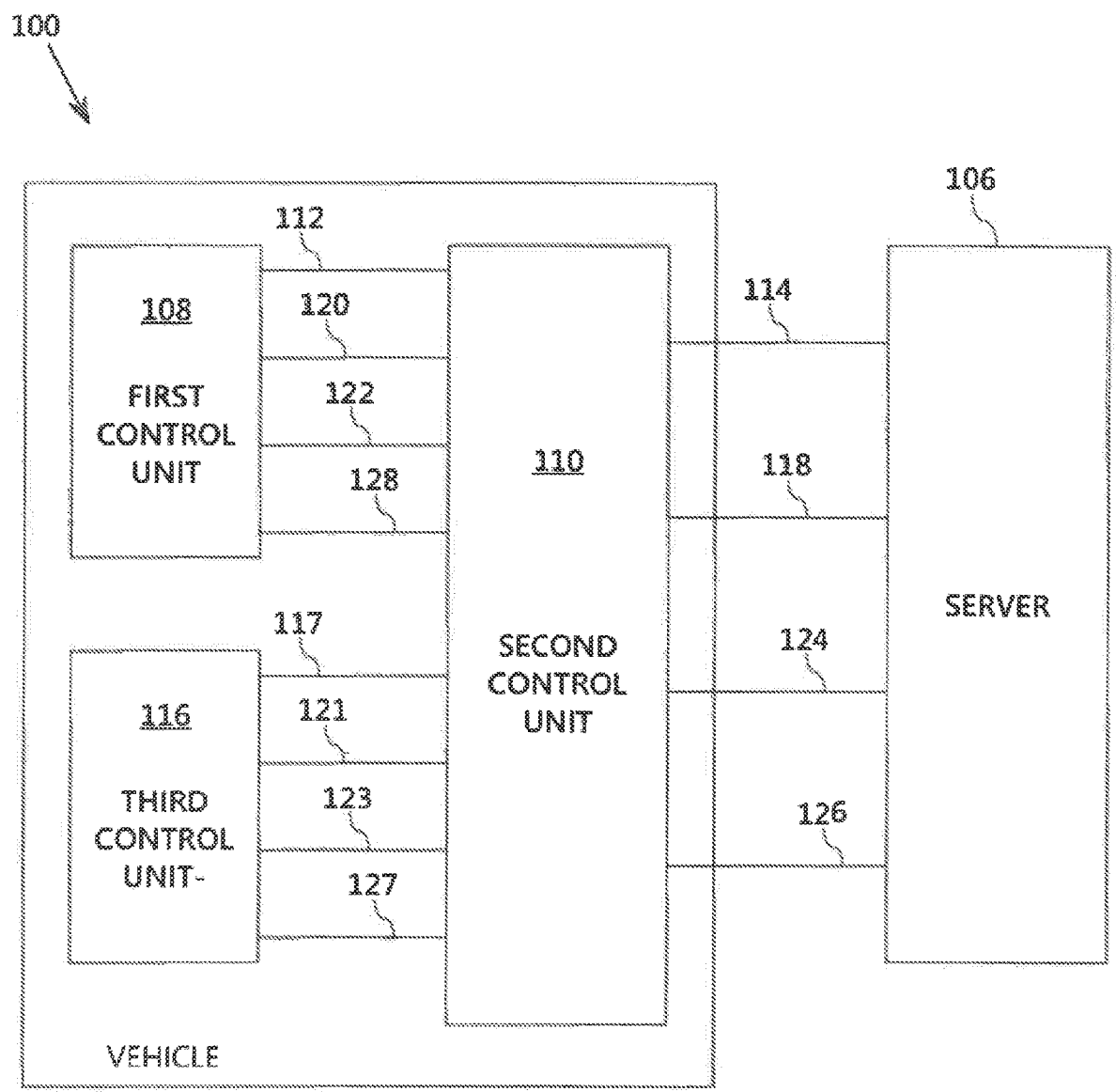
FIG. 1 schematically shows an exemplary method for transmitting data elements from a vehicle to a server, and FIG. 2 schematically shows an exemplary data memory of a control unit of a vehicle.

In detail, FIG. 1 shows an exemplary method 100 for transmitting one or more data elements from one or more vehicles 102 to a server 106 via a communication channel between the vehicle 102 and the server 106. The server 106 may be a backend server or a server farm, for example a cloud computing system or a computing cluster. The vehicle is preferably a motor vehicle driving in a partially automated, highly automated or fully automated manner.

The method 100 can determine a first event by means of a first control unit 108 of the vehicle 102. The first event is preferably an event of a driver assistance system of the vehicle 102. An event may be specified by an event definition. Each event, for example the first event, a second event, a third event, etc., may comprise an event definition which preferably uniquely specifies the respective event. The event definition may be, for example, an XML data set or an XML file comprising the event definition. A plurality of events may be stored in a database which may be stored on the respective control unit. In this case, each control unit may store the events relevant to the respective control unit in a database of the respective control unit.

The event definition of an event may comprise an event name, a priority, an event identifier, one or more trigger conditions, a starting time, an end time and/or one or more signals. Table 1 and table 2 show two exemplary event definitions.

TABLE 1

Example of a first event definition

| | |
|---|---|
| Event name | Driver takes over control without a prior request |
| Priority | 2 |
| Event identifier | 1 |

TABLE 1-continued

Example of a first event definition

| | |
|---|---|
| Trigger | "HAD active = TRUE" AND "Driver takeover = TRUE" and "PORT = FALSE" |
| Starting time | −20 s |
| End time | +20 s |
| Signals | Date, time |
| | Position |
| | Mileage |
| | ax, ay, az, yaw |
| | Steering angle, steering torque, brake/gas pedal position |
| | Vehicle speed |
| | Camera images |
| | Object list |

TABLE 2

Example of a second event definition

| | |
|---|---|
| Event name | Lane change is automatically aborted |
| Priority | 2 |
| Event identifier | 2 |
| Trigger condition | "HAD active = TRUE" AND "Abort lane change = TRUE" |
| Starting time | −20 s |
| End time | +20 s |
| Signals | Date, time |
| | Position |
| | Mileage |
| | ax, ay, az, yaw |
| | Steering angle, steering torque, brake/gas pedal position |
| | Vehicle speed |
| | Camera images |
| | Object list |
| | Trajectory selection |

An event, for example the first event, may be dependent on a context which can be uniquely identified by means of one or more trigger conditions or triggers. In other words, the event definition of an event may comprise one or more trigger conditions which uniquely identify the event. The one or more trigger conditions may be adapted by the server 106. For example, the server 106 may transmit an update message to the vehicle 102, wherein the update message comprises updated trigger conditions. In detail, the server 106 can transmit the update message to a second control unit 110. The second control unit 110 can receive the update message from the server 106 and can transmit it to the first control unit 108 which can in turn receive the update message from the second control unit 110. On the basis of the update message, the first control unit 108 can adapt existing trigger conditions using the updated trigger conditions.

Furthermore, the event definition of an event may comprise a priority or a priority value which indicates the priority with which the event should be handled. The priority of the event may stipulate, for example, whether a data element associated with the event in the data memory of the first control unit 108 can be overwritten. Furthermore, the priority of the event may stipulate the priority with which the event is transmitted from the first control unit 108 to the second control unit 110 and/or from the second control unit 110 to the server 106 and/or the priority with which a data element associated with the event is transmitted from the first control unit 108 to the second control unit 110 and/or from the second control unit 110 to the server 106. The priority or the priority value can be adapted by the server 106. For example, the server 106 can transmit an update message to the vehicle 102, in particular to the second control unit 110, wherein the update message comprises an updated priority of an event. The second control unit 110 can receive the update message from the server 106 and can transmit it to the first control unit 108 which may in turn receive the update message from the second control unit 110. On the basis of the update message, the first control unit 108 can adapt the existing priority using the updated priority. The importance of an event can be dynamically adapted by adapting the priority by means of the server 106. The server 106 may efficiently control, for example, which events are transmitted at what speed from the vehicle 102 to the server 106.

If an event has a priority of 1 for example, this event and/or a data element associated with the event can be transmitted from the first control unit 108 to the second control unit 110 and from the second control unit 110 to the server 106 without a request from the server 106, for example. If an event has a priority of greater than a predefined threshold value, for example a priority of >3, a data element associated with this event can be overwritten in the data memory of the first control unit 108 if a memory area in which the data element is stored is needed to store further data from signals from the first control unit 108.

Furthermore, the event definition of the event may have a unique event identifier which uniquely identifies the event. The event definition of an event may comprise a starting point and an end point of an interval of time which indicates the period of time in which signals are relevant to the event. The starting time and/or the end time of the interval of time may be stated in a manner relative to the time of the event. The event definition of an event may comprise one or more signals which are relevant to the event. A data element associated with the event, for example the first data element associated with the first event, preferably comprises all data from signals relating to an event between the starting time and the end time, which is stipulated in the event definition of the event.

For example, the method 100 may determine the first event by means of the first control unit 108 of the vehicle 102 using the event definition of the first event. As described above, the event definition comprises one or more trigger conditions which uniquely identify the first event. If all of the trigger conditions of the event definition have been met, the method 100 can determine the first event by means of the first control unit 108.

The method 100 may also determine a first data element associated with the first event in a data memory of the first control unit 108 of the vehicle 102. As described above, the event definition can stipulate the signals which are relevant to the first event in the data memory of the first control unit 108. The data from the signals which are indicated in the event definition of the first signal may form the first data element. In other words, the first data element comprises the data from the signals which are stipulated in the event definition of the first event. The data memory of the first control unit 108 can store data from signals in compliance with data protection. For example, the data memory of the first control unit 108 may automatically filter personal data from the signals and may store the filtered data from the signals. This makes it possible to prevent only data from signals which comply with data protection from being transmitted in the first data element from the vehicle 102 to the server 106. Furthermore, the first data element may be determined and/or adapted on the basis of the server 106 and/or a software component of the server 106 which requests the first data element and/or to which the first data element is transmitted.

Figure 2:
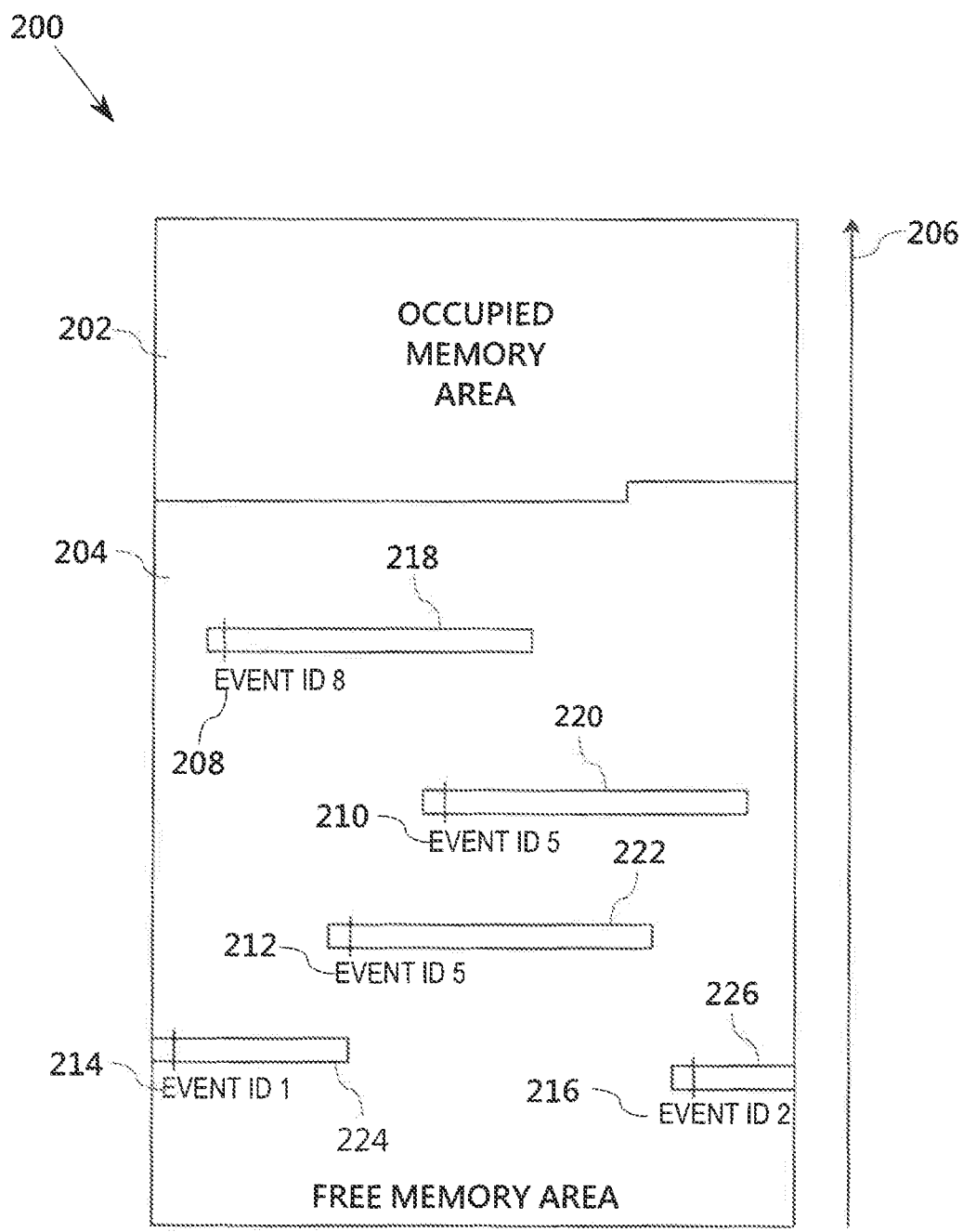

The method 100 may block the first data element in the data memory of the first control unit 108 of the vehicle 102. The blocking of the first data element may prevent the first data element from being overwritten on the basis of a priority of the first event. In detail, FIG. 2 shows an exemplary data memory 200 of a control unit, in particular of the first control unit 108, of the vehicle 102. The data memory 200 comprises an occupied memory area 202 and a free memory area 204. The data memory 200 may have a writing direction 206, in the direction of which data are written to the data memory 200. Events 208, 210, 212, 214, 216 and the respective data elements 218, 220, 222, 224, 226 are illustrated in the data memory 200 in FIG. 2.

The method 100 may transmit the first event from the vehicle 102 to the server 106 via the communication channel. In detail, the method 100 may transmit 112 the first event from the first control unit 108 of the vehicle 102 to the second control unit 110 of the vehicle 102. The method 100 may receive the first event from the first control unit 108 of the vehicle 102 by means of the second control unit 110 of the vehicle 102. Furthermore, the method 100 may transmit 114 the first event from the second control unit 110 of the vehicle 102 to the server 106 via the communication channel. The first event can preferably be transmitted from the second control unit 110 of the vehicle 102 to the server 106 on the basis of the priority of the first event.

The second control unit 110 of the vehicle 102 can preferably collect events for a predefined interval of time on the basis of the respective priority of the events and can transmit the collected events to the server 106. For example, a third control unit 116 can transmit 117 a second event to the second control unit 110 and the second control unit 110 can receive the second event from the third control unit 116 of the vehicle 102. The second event may have the same priority as the first event. Alternatively, the second event may have a higher or lower priority than the first event. Depending on the priority, the second control unit 110 may collect the first event and the second event and may transmit the collected events to the server 106 at the request of the server 106 or after expiry of the predefined interval of time. If, for example, the priority of the first event or of the second event corresponds to the highest priority, the second control unit 110 can transmit the event with the highest priority to the server 106 without the event with the highest priority being collected by the second control unit 110. The server 106 can hereby receive events with the highest priority more quickly from the vehicle 102.

The method 100 may receive the first event and/or the second event from the second control unit 110 of the vehicle 102 by means of the server 106 via the communication channel. Furthermore, the method 100 may determine a relevance parameter of the first event and/or of the second event by means of the server 106. The relevance parameter may be representative of a relevance of the first event and/or of the second event to the server 106. The relevance parameter may be determined on the basis of a data analysis pattern of a data analysis function of the server 106. For example, the relevance parameter may be determined on the basis of the following parameters:
 one or more vehicle parameters;
 a frequency of the event;
 a location of the event;
 a type of event; and/or
 a priority of the event.

If the relevance parameter indicates that the first event and/or the second event is/are relevant to the server 106, the method 100 may transmit 118 a message for requesting the first data element associated with the first event and/or for requesting the second data element associated with the second event from the server 106 to the second control unit 110 of the vehicle 102 via the communication channel. The second control unit 110 may receive the message for requesting the first data element associated with the first event and/or for requesting the second data element associated with the second event from the server 106 via the communication channel. After receiving the message for requesting the first data element associated with the first event and/or for requesting the second data element associated with the second event from the server 106, the second control unit 110 of the vehicle 102 may determine the control unit which stores the respective data element. For example, the second control unit 110 of the vehicle 102 may determine the first control unit 108 if the message requests the first data element. For example, the second control unit 110 of the vehicle 102 may determine the third control unit 116 if the message requests the second data element.

Furthermore, the second control unit 110 of the vehicle 102 may transmit 120 the message for requesting the first data element from the second control unit of the vehicle to the first control unit of the vehicle. The first control unit 108 of the vehicle 102 may receive the message for requesting the first data element from the second control unit 110 of the vehicle 102 and may determine the first data element in the data memory of the first control unit 108 of the vehicle 102. For example, the first data element may be determined by combining the data which have been blocked by means of the event specification of the first event in the data memory of the first control unit to form the first data element.

The first control unit 108 of the vehicle 102 may transmit 122 the first data element to the second control unit 110 of the vehicle 102. The second control unit 110 of the vehicle 102 in turn may receive the first data element from the first control unit 108 of the vehicle 102.

Furthermore, the second control unit 110 of the vehicle 102 may transmit 121 the message for requesting the second data element from the third control unit 116 of the vehicle 102 to the third control unit of the vehicle. The third control unit 116 of the vehicle 102 may receive the message for requesting the second data element from the second control unit 110 of the vehicle 102 and may determine the second data element in the data memory of the third control unit 116 of the vehicle 102. For example, the second data element may be determined by combining the data which have been blocked by means of the event specification of the second event in the data memory of the third control unit 116 to form the second data element.

The third control unit 116 of the vehicle 102 may transmit 123 the second data element to the second control unit 110 of the vehicle 102. The second control unit 110 of the vehicle 102 in turn may receive the second data element from the third control unit 116 of the vehicle 102.

After the second control unit 110 of the vehicle has received the first data element from the first control unit 108 and/or the third control unit 116 of the vehicle 102, the second control unit 110 of the vehicle may determine a communication-channel-specific parameter of the communication channel between the second control unit 110 of the vehicle and the server 106. For example, the communication-channel-specific parameter may be an available bandwidth of the communication channel. The second control unit 110 of the vehicle 102 may transmit 124 the first data element to the server 106 on the basis of the communication-channel-specific parameter of the communication channel. The second control unit 110 preferably transmits the first data element and/or the second data element only if an available bandwidth exceeds a predefined threshold value. Additionally or alternatively, the second control unit 110 of the vehicle 102 can transmit the first data element and/or the second data element to the server 106 on the basis of the communication-channel-specific parameter of the communication channel and/or the priority of the first event. For example, the second control unit 110 may transmit the first data element and/or the second data element even in the case of a lower available bandwidth if the priority of the first event and/or of the second event is high, for example if the first event and/or the second event has/have the highest priority.

The server 106 may receive the first data element and/or the second data element from the second control unit 110 of the vehicle 102 via the communication channel. If the first data element and/or the second data element has/have been completely received by the server from the second control unit of the vehicle, a release command for releasing the first data element and/or the second data element can be transmitted 126 from the server 106 to the second control unit 110 of the vehicle 102 via the communication channel. The release command for releasing the first data element and/or the second data element from the server via the communication channel can be received by the second control unit 110 of the vehicle 102. Furthermore, the release command for releasing the first data element may be transmitted 128 from the second control unit 110 of the vehicle 102 to the first control unit 108 of the vehicle 102 and the release command for releasing the first data element may be received by the first control unit 108 of the vehicle 102 from the second control unit 110 of the vehicle 102. The release command can be executed by the first control unit 108, with the result that the first data element in the data memory of the first control unit 108 is released. Furthermore, the release command for releasing the second data element can be transmitted 127 from the second control unit 110 of the vehicle 102 to the third control unit 116 of the vehicle 102 and the release command for releasing the second data element can be received by the third control unit 116 of the vehicle 102 from the second control unit 110 of the vehicle. The release command can be executed by the third control unit 116, with the result that the second data element in the data memory of the third control unit 116 is released.

If the relevance parameter indicates that the first event and/or the second event is/are not relevant to the server 106, a release command for releasing the first data element associated with the first event and/or the second data element associated with the second event can be transmitted 126 from the server 106 to the second control unit 110 of the vehicle 102 via the communication channel. The release command for releasing the first data element associated with the first event and/or for releasing the second data element associated with the second event can be received by the second control unit 110 of the vehicle 102 from the server 106. The second control unit 110 of the vehicle 102 can transmit 128 the release command for releasing the first data element associated with the first event to the first control unit 108 of the vehicle 102. The first control unit 108 of the vehicle 102 can receive the release command for releasing the first data element associated with the first event from the second control unit 110 of the vehicle 102 and can execute it for the purpose of releasing the first data element in the data memory of the first control unit 108. The second control unit 110 of the vehicle 102 can transmit 127 the release command for releasing the second data element associated with the second event to the third control unit 116 of the vehicle 102. The third control unit 116 of the vehicle 102 may receive the release command for releasing the second data element associated with the second event from the second control unit 110 of the vehicle 102 and may execute it for the purpose of releasing the second data element in the data memory of the third control unit 116.

Large volumes of data, that is to say volumes of data with 100 or more megabytes, can be advantageously efficiently transmitted from the vehicle 102 to the server 106 during a journey of the vehicle 102. It is no longer necessary to visit a workshop in order to transmit large volumes of data from the vehicle 102. Event-related data can be buffered in the vehicle 102 and, depending on their relevance to the server 106, can be transmitted from the vehicle 102 to the server 106 and released on the vehicle 102. The frequency with which the data elements are transmitted to the server 106 can be configured by adapting the priorities of the events and/or the relevance parameter. Furthermore, the transmission to the server 106 can be carried out only in the case of low utilization of the communication channel of the vehicle 102, with the result that further functions, for example customer functions, are not impaired by transmitting the data elements. Furthermore, the data can be transmitted independently of a service stop of the vehicle 102, which can reduce the downtimes of the vehicle 102 and can efficiently increase the availability of the vehicle 102.

LIST OF REFERENCE SIGNS

100 Method
102 Vehicle
106 Server
108 First control unit
110 Second control unit
112 Transmission of an event
114 Transmission of an event
116 Third control unit
117 Transmission of an event
118 Transmission of a request message
120 Transmission of a request message
121 Transmission of a request message
122 Transmission of a data element
123 Transmission of a data element
124 Transmission of a data element
126 Transmission of a release command
127 Transmission of a release command
128 Transmission of a release command
200 Data memory
202 Free memory area
204 Occupied memory area
206 Writing direction
208 Event
210 Event
212 Event
214 Event
216 Event
218 Data element
220 Data element
222 Data element
224 Data element
226 Data element

The invention claimed is:

1. A method for transmitting one or more data elements from a vehicle to a server via a communication channel between the vehicle and the server, the method comprising:
the vehicle determining a first event;
transmitting the first event from the vehicle to the server via the communication channel;
receiving a message requesting a first data element associated with the first event from the server to the vehicle via the communication channel, if the server determines a relevance parameter of the first event that indicates that the first event is relevant to the server,
the vehicle receiving the message for requesting the first data element associated with the first event from the server via the communication channel;
the vehicle determining the first data element associated with the first event;
determining in the vehicle a communication-channel-specific parameter of the communication channel;
transmitting the first data element from the vehicle to the server via the communication channel based at least in part on the determined communication-channel-specific parameter of the communication channel;
receiving from the server transmitting a release command for releasing the first data element; and
the vehicle executing the release command for a purpose of releasing from write protection the first data element in a data memory of a first control unit;
wherein transmitting the first event from the vehicle to the server via the communication channel comprises,
transmitting the first event from the first control unit of the vehicle to a second control unit of the vehicle;
the second control unit of the vehicle receiving the first event from the first control unit of the vehicle; and
transmitting the first event from the second control unit of the vehicle to the server via the communication channel; and
wherein the method further comprises,
receiving at the second control unit of the vehicle from the server a release command for releasing the first data element via the communication channel, responsive to the first data element being completely received by the server from the second control unit of the vehicle;
transmitting the release command for releasing the first data element from the second control unit of the vehicle to the first control unit of the vehicle;
the first control unit of the vehicle receiving the release command for releasing the first data element from the second control unit of the vehicle; and
the first control unit executing the release command for a purpose of releasing from the write protection the first data element in the data memory of the first control unit.

2. The method as claimed in claim 1, wherein the determination of the first event by the vehicle comprises:
determining the first event using the first control unit of the vehicle;
determining the first data element associated with the first event in the data memory of the first control unit of the vehicle; and
responsive to an event specification, adding the write protection to the first data element in the data memory of the first control unit of the vehicle.

3. The method as claimed in claim 1, wherein determining the first data element associated with the first event comprises:
transmitting the message for requesting the first data element from the second control unit of the vehicle to the first control unit of the vehicle;
the first control unit of the vehicle receiving the message for requesting the first data element from the second control unit of the vehicle;
determining the first data element in the data memory of the first control unit of the vehicle;
transmitting the first data element from the first control unit of the vehicle to the second control unit of the vehicle; and
the second control unit of the vehicle receiving the first data element from the first control unit of the vehicle.

4. The method as claimed in claim 1, further comprising:
a third control unit of the vehicle determining a second event;
determining a second data element associated with the second event in a data memory of the third control unit of the vehicle;
adding write protection to the second data element in the data memory of the third control unit of the vehicle;
transmitting the second event from the third control unit of the vehicle to the second control unit of the vehicle;
the second control unit of the vehicle receiving the second event from the third control unit of the vehicle; and
transmitting the second event from the second control unit of the vehicle to the server.

5. The method as claimed in claim 1, wherein the first event and/or the first data element are transmitted from the second control unit of the vehicle to the server during a journey of the vehicle.

6. The method as claimed in claim 1, wherein the relevance parameter is representative of a relevance of the first event with respect to an event analysis pattern of an event analysis function of the server.

7. A non-transitory computer-readable medium for transmitting one or more data elements from a vehicle to a server, wherein the non-transitory computer-readable medium comprises instructions which, when executed on a computer or a control unit, carry out the method as claimed in claim 1.

8. A system for transmitting one or more data elements from a vehicle to a server, wherein the system is configured to carry out the method as claimed in claim 1.

9. A vehicle for transmitting one or more data elements from the vehicle to a server, comprising the system as claimed in claim 8.

10. The method as claimed in claim 1, wherein the communication-channel-specific parameter is at least one of the group consisting of:
an available bandwidth, an error rate, and a parameter of a communication protocol of the communication channel.

11. A method for transmitting one or more data elements from a vehicle to a server via a communication channel between the vehicle and the server, the method comprising:
the vehicle determining a first event;
transmitting the first event from the vehicle to the server via the communication channel;
receiving a message requesting a first data element associated with the first event from the server to the vehicle via the communication channel, if the server determines a relevance parameter of the first event that indicates that the first event is relevant to the server,
the vehicle receiving the message for requesting the first data element associated with the first event from the server via the communication channel;
the vehicle determining the first data element associated with the first event;
determining in the vehicle a communication-channel-specific parameter of the communication channel;
transmitting the first data element from the vehicle to the server via the communication channel based at least in part on the determined communication-channel-specific parameter of the communication channel;
receiving from the server transmitting a release command for releasing the first data element; and
the vehicle executing the release command for a purpose of releasing from write protection the first data element in a data memory of a first control unit;
wherein transmitting the first event from the vehicle to the server via the communication channel comprises,
transmitting the first event from the first control unit of the vehicle to a second control unit of the vehicle;
the second control unit of the vehicle receiving the first event from the first control unit of the vehicle; and
transmitting the first event from the second control unit of the vehicle to the server via the communication channel; and
wherein the method further comprises,
receiving at the second control unit of the vehicle from the server a release command for releasing the first data element associated with the first event via the communication channel, responsive to the relevance parameter indicating that the first event is not relevant to the server;
the second control unit of the vehicle receiving the release command for releasing the first data element associated with the first event from the server via the communication channel;
transmitting the release command for releasing the first data element associated with the first event from the second control unit of the vehicle to the first control unit of the vehicle;
the first control unit of the vehicle receiving the release command for releasing the first data element associated with the first event from the second control unit of the vehicle; and
the first control unit executing the release command for a purpose releasing from write protection the first data element associated with the first event in a data memory of the first control unit.

12. The method as claimed in claim 11, wherein the relevance parameter is representative of a relevance of the first event with respect to an event analysis pattern of an event analysis function of the server.

13. The method as claimed in claim 11, wherein the first event and/or the first data element are transmitted from the vehicle to the server during a journey of the vehicle.

14. A non-transitory computer-readable medium for transmitting one or more data elements from a vehicle to a server, wherein the non-transitory computer-readable medium comprises instructions which, when executed on a computer or a control unit, carry out the method as claimed in claim 11.

15. A system for transmitting one or more data elements from a vehicle to a server, wherein the system is configured to carry out the method as claimed in claim 11.

16. A vehicle for transmitting one or more data elements from the vehicle to a server, comprising the system as claimed in claim 15.

17. The method as claimed in claim 11, wherein the communication-channel-specific parameter is at least one of the group consisting of:
    an available bandwidth, an error rate, and a parameter of a communication protocol of the communication channel.

* * * * *